3,311,449
PROCESS OF RECOVERING VALUABLE COMPONENTS FROM RED MUD
Masumi Atsukawa, Yoshihiko Nishimoto, Yoshitsugu Iwaiya, and Haro Kuwabara, Hiroshima, Japan, assignors to Mitsubishi Shipbuilding & Engineering Company, Limited, Tokyo, Japan, a corporation of Japan
Filed Feb. 7, 1963, Ser. No. 256,976
Claims priority, application Japan, Feb. 12, 1962, 37/4,481
7 Claims. (Cl. 23—130)

This invention relates to a process of recovering valuable components from a red mud produced as a by-product in manufacturing alumina from bauxite and other similar crude ores according to alkali extraction process such as the Bayer process, and more particularly to such a process comprising treating the red mud with gaseous sulfur dioxide.

At present, the Bayer process is substantially exclusively used to manufacture alumina. The Bayer process comprises, as its first step, leaching or digesting bauxite and other similar crude ores with a solution of sodium hydroxide to extract alumina contained therein as a solution of sodium aluminate. At the same time, a third or a half the amount of the crude ore used is normally discharged as a residual red mud. Only one portion of the red mud thus discharged is commonly employed as a material for improving soil and in pigments with the great part thereof is not used because suitable uses for the same have not yet been found.

The elemental analysis of such red mud indicates that it includes, in addition to iron oxide, titanium dioxide, silica, etc., alumina in an amount as high as on the order of from 10 to 25% by weight and sodium compounds in a total amount of from 7 to 12% by weight. This contributes inevitably to the fact that, in order to remove silica contained in the aforesaid crude ores from the same, the Bayer process or any other similar process of manufacturing alumina relies upon the conversion of the silica into insoluble sodium alumino-silicate during alkali treatment as above described and then separating from soluble sodium aluminate the insoluble sodium aluminosilicate together with insoluble iron and titanium dioxide etc. in the form of red mud. Further, under present conditions, each of the just described ingredients contained in the red mud can be economically separated from the same only with extreme difficulty. Thus the lack of use of the red mud as previously pointed out is generally considered inevitable. It is very desirable to extract various valuable components from the red mud.

Accordingly, it is the chief object of the invention to provide a novel process of effectively and economically recovering valuable components such as sodium compounds, iron oxide and titanium dioxide, silica and alumina respectively from a red mud accessorily produced in manufacturing alumina from bauxite and other similar crude ores according to alkali extraction processes such as the Bayer process.

Another object of the invention is to provide a novel process as described in the preceding paragraph and using any waste gas containing gaseous sulfur dioxide. Accordingly, an additional object of the invention is to remove gaseous sulfur dioxide from any waste gas containing the same.

According to the teachings of the invention, the red mud referred to is first added with water to form a slurry including the red mud of a suitable concentration and then gaseous sulfur dioxide is absorbed by the slurry to control the pH of the same to a value ranging from 3.5 to 6 and preferably of the order of 4.3 to dissolve sodium compounds contained in the red mud. The dissolved sodium compounds comprises essentially sodium bisulfite and may include sodium sulfite in a small amount. By separating from the resulting insoluble residue an aqueous solution thus produced, the sodium component can be recovered. Then water is added to the insoluble residue to form an aqueous suspension and gaseous sulfur dioxide is blown in through the aqueous suspension to adjust the pH of the same to a value ranging from 1.5 to 2.5 and preferably of the order of 1.9 to dissolve soluble compounds contained in the residue. That portion of the residue remaining insoluble includes essentially iron oxide and titanium dioxide. Thus, such oxides can be recovered after the separation of the same from the resulting aqueous solution. In order to recover silica, this aqueous solution can be heated to drive off some of the sulfur dioxide contained in the same to adjust the pH of the solution to a value ranging from 2.5 to 3.0 and preferably of the order of 2.9 to deposit silica. An aqueous solution separated from the deposited silica is further heated to drive off some of the sulfur dioxide contained in the same to adjust the pH of the solution to a value above 3.5 and preferably of the order to 4.3 to deposit basic aluminum bisulfite. After having been separated, the deposited basic aluminum bisulfite is dried and calcined at a temperature of from 500° to 700° C. and preferably of the order of 600° C. to be decomposed into alumina with a hot gas containing gaseous sulfur dioxide being evolved. Thus alumina is recovered.

Gaseous sulfur dioxide evolved in the steps of depositing silica and basic aluminum bisulfite may be advantageously fed back to the preceding steps of recovering the sodium compounds and iron oxide and titanium dioxide.

The hot gas containing gaseous sulfur dioxide and evolved upon decomposing the basic aluminum bisulfite may be conveniently used to dry the basic aluminum bisulfite and then to be fed back to the preceding steps of recovering the sodium compounds, and iron oxide and titanum dioxide respectively.

The invention will become more readily apparent from the following detailed description taken in conjunction with the accompanying drawings in which.

As previously described, a red mud produced as a by-product in manufacturing alumina from bauxite and other similar crude ores according to alkali extraction technique, contains various valuable components in relatively high amounts. As an example, the elemental analysis indicates that such a red mud comprises, by weight, 18.9% $Al_2O_3$, 8.3% $Na_2O$, 17.4% $SiO_2$, 39.3% $Fe_2O_3$, 2.8% $TiO_2$ and 10.5% ignition losses. From these figures it will be apparent that it is a serious theme in the alumina industry to extract Al, Na, Si, Fe and Ti compounds from the aforesaid red mud in a simple, inexpensive manner.

Briefly, the process of the invention comprises the steps of adding water to the red mud to form a slurry containing the red mud of a predetermined concentration and absorbing gaseous sulfur dioxide by the slurry to separate dissolved sodium compounds from the solids or residue. Then the addition of water to the residue forms an aqueous suspension on which gaseous sulfur dioxide acts to dissolve alumina followed by separation of insoluble iron oxide, titanium dioxide, etc. from the resulting solution. The solution is adequately heated to drive off some of the sulfur dioxide as a gas and deposit silica. The deposited silica is separated from the remaining solution and the sulfur dioxide driven off may be advantageously supplied to the preceding steps. The remaining solution is further heated to drive off some of the gaseous sulfur dioxide which may, in turn, be preferably supplied to the preceding steps and simultaneously to deposit basic aluminium bisulfite. After having been separated, the basic aluminum bisulfite is calcined to give alumina. The process of the invention comprising a series of the steps just described has been found to be capable of recovering subsequently the valuable components such as sodium compounds, iron oxide and titanium dioxide, silica and alumina from the red mud in a simple manner and with high yields.

In practicing the invention, gaseous sulfur dioxide of high purity may be preferably used. However, gaseous sulfur dioxide contained in waste gases discharged from metal refining plants, chemical plants, steam power stations, etc. may also advantageously be utilized. As is well known, gaseous sulfur dioxide is typical of harmful materials inflicting injury upon men and domestic animals and the crops and also causing structures to be corroded. Thus, the utilization of such waste gases provides a novel process having the dual purpose of preventing the public from being injuriously affected and of recovering valuable components from the red mud referred to. From this it will be readily appreciated that the invention is extremely advantageous.

Figure 1:
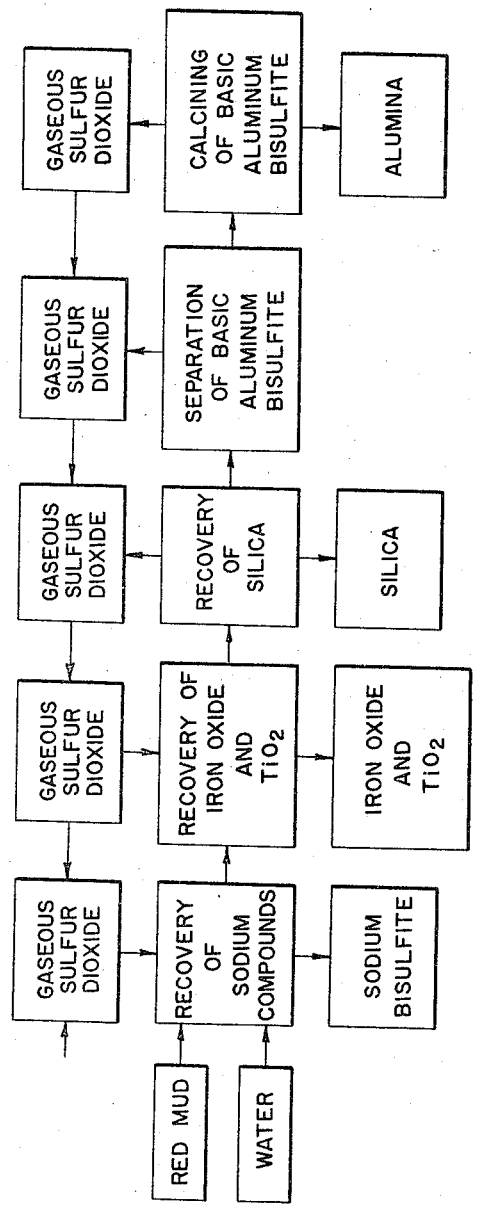
FIG. 1 shows a flow sheet illustrating, in block form a series of the steps according to the teachings of the invention.

Referring now to FIG. 1 of the drawings, there is shown a flow sheet illustrating a series of steps according to the teachings of the invention. The process of the invention can be broadly classified into five steps. As seen in FIG. 1, a first step is to absorb gaseous sulfur dioxide by a slurry composed of the aforesaid red mud including added thereto water to separate sodium compounds in the form of an aqueous solution of sodium bisulfite from the resulting solids or residue. This solution may often include a small amount of sodium sulfite. This step is called the step of recovering sodium component. At a second stage water is added to the solids or residue yielded at the preceding step to thereby form an aqueous suspension by which relatively concentrated gaseous sulfur dioxide is absorbed to separate the insoluble iron oxide and titanium dioxide from the resulting solution. Thus the second step is called the step of recovering iron oxide and titanium dioxide. A third or silica recovering step comprises heating the aqueous solution resulting from the second step to drive off some of the sulfur dioxide as a gas to precipitate the solids containing silica for the purpose of recovering the latter. At the succeeding or fourth step an aqueous solution leaving the third step is further heated to drive off some of the sulfur dioxide as a gas to separate the deposited basic aluminum bisulfite from the residual solution. This step is called the step of separating basic aluminum bisulfite. The last or fifth step comprises calcining the basic aluminum bisulfite thus obtained to produce alumina with gaseous sulfur dioxide being evolved and is called the step of calcining basic aluminum bisulfite.

Any or all of concentrated gaseous sulfur dioxide evolved at the steps of recovering silica, separating basic aluminum bisulfite and calcining the latter may be suitably used to be fed back to the step of recovering sodium component and/or the step of recovering iron oxide and titanium dioxide.

At the step of recovering sodium component an amount of relatively concentrated gaseous sulfur dioxide is introduced into the slurry of red mud to dissolve the sodium component in the form of sodium bisulfite. The resulting solution may include in addition to sodium bisulfite sodium sulfite in a small amount. It is to be noted that the sodium component should be separated as fully as possible at the step of recovering the same in order to improve separation of silica and alumina effected at the subsequent steps.

It has been found that this requirement is met by properly selecting the pH value of the slurry of red mud used. If the pH value of the slurry is too high a reaction by which a sodium compounds contained in the red mud is dissolved out as soluble sodium bisulfite with or without soluble sodium sulfite will not sufficiently proceed resulting in decrease in yield of the sodium compounds. On the contrary, if the pH value of the slurry is too low there is a risk of dissolving out alumina, iron oxide, silica, etc. contained in the red mud together with the sodium compounds whereby the purity of sodium compound or compounds produced is reduced. Consequently, it has been discovered that the pH value of the slurry used should be in a range of from 3.5 to 6.0 and preferably on the order of 4.3.

An experiment conducted with the pH value of the slurry set to 4.3 indicated that the composition of the separated solution was 1.78% $Al_2O_3$, 7.8% $SiO_2$ and 90.42% $Na_2O$. Taking into account the composition of the original red mud, the above figures correspond substantially to yields in percent of 88.6, 3.6 and 0.8 respectively for $Na_2O$, $SiO_2$ and $Al_2O_3$. This means that the sodium compounds could be separated and recovered with a high yield.

If a waste gas containing gaseous sodium dioxide will be used with the invention another requirement should be met. In this case, gaseous sulfur dioxide contained in the waste gas is absorbed in the slurry of red mud to be reacted with sodium compounds in the slurry. It has been found that the conditions of the slurry such as the concentration of the red mud and the temperature of the slurry affect greatly its ability to absorb sulfur dioxide and particularly in the case a concentration of sulfur dioxide contained in the waste gas is low. According to another feature of the invention, the concentration of the red mud contained in the slurry should be substantially at most 40% by weight in order to maintain the fluidity of the slurry necessary for use as a liquid absorbent. Experiments indicated that the concentration of the red mud within the range above specified scarcely affects the ability of the slurry to absorb sulfur dioxide. In addition, the temperature of the slurry should range from room temperature to 100° C. It has been found, however, that the lower temperature of the slurry gives the better result.

An example of the absorption step will now be described. A gas absorber of impinging type is used to scrub a waste gas with the slurry as above described. The waste gas used comprised a composition consisting of 0.2% by weight of sulfur dioxide, 3% by weight of oxygen, 8.5% by weight of water vapor, 12.5% by weight of carbon dioxide and the balance being nitrogen. The following table shows a variation in absorption factor of slurry for sulfur dioxide dependent upon the concentration and temperature of the slurry.

As shown in the table the absorption factor of the slurry for sulfur dioxide is increased as the temperature of the slurry is decreased.

TABLE

| Concentration of slurry in percent by weight | 30 | | | | 20 | 10 |
| --- | --- | --- | --- | --- | --- | --- |
| Temperature of slurry in ° C | 40 | 50 | 70 | 95 | 40 | 40 |
| Absorption factor of sulfur dioxide in percent | 79.5 | 72 | 62 | 42.5 | 75 | 78 |

A residue filtered out at the first step at which sodium components have been yielded is passed through the step of recovering iron oxide and titanium dioxide. At the latter step, the residue includes added thereto water to form an aqueous suspension. Then the introduction of relatively concentrated gaseous sodium dioxide into the aqueous suspension reduces the pH value of the same down to the minimum below which iron oxide contained in the residue will be dissolved to thereby dissolve alumina in the form of soluble aluminum bisulfite. Thus, insoluble iron oxide and titanium dioxide are separated from the resulting solution with silica separated to some extent. It has been found that the pH of the aqueous suspension should be reduced down to a value within a range of from 1.5 to 2.5 and preferably to the order of 1.9.

Gaseous sulfur dioxide evolved at the succeeding steps of driving off some of the same as will be described hereinafter is preferably used as the gaseous sulfur dioxide introduced into the aqueous suspension.

As an example, water was added to the residue to form an aqueous suspension having a concentration of 30% and then the aqueous suspension was reduced in pH value to 1.9 by having absorbed thereby gaseous sulfur dioxide to yield an insoluble residue comprising a composition including, by weight, 76.8% $Fe_2O_3$, 5.5% $TiO_2$, 7.4% $Al_2O_3$ and 10.3% $SiO_2$. Considering the composition of the original red mud these figures corresponds substantially to yields in percents of 100, 100, 30.6 and 20.0, respectively, for $Fe_2O_3$, $TiO_2$, $Al_2O_3$ and $SiO_2$. This indicates that iron oxide and titanium dioxide have been completely recovered.

The step of recovering silica is to deposit and separate silica from a filtrate obtained at the step just described. It has found that the degree of separation of silica depends critically upon the pH value and concentration of the filtrate. Thus, adjustment is required to be properly made as to both the amount of gaseous sulfur dioxide driven from the filtrate by heating operation and the amount of rinsing water used for filtering out iron oxide and titanium dioxide at the preceding step. The results of experiments indicated that the pH value of the solution should be within a range of from 2.5 to 3.0 and preferably on the order of 2.9. An experiment conducted with a dilution ratio of 5 and a pH value of 2.9 yielded an insoluble matter comprising a composition including by weight, 81% $Al_2O_3$ and 91.9% $SiO_2$. Thus approximately 64% of the silica contained in the original red mud was recovered. After silica has been filtered out there remains a filtrate including, by weight 74.0% $Al_2O_3$ and 1.7% $SiO_2$.

The filtrate thus obtained can now be passed to the fourth step of separating basic aluminum bisulfite. At this step the filtrate is suitably heated to drive off some of the gaseous sulfur dioxide to thereby increase the pH value whereby basic aluminum bisulfite is deposited and then separated from the solution. It has been found that the pH value of the filtrate should be 3.9 or more and preferably on the order of 4.3.

At the last step the separated basic aluminum bisulfite is calcined at a temperature ranging from 500° to 700° C. to be decomposed into concentrated gaseous sulfur dioxide and alumina. The results of experiments indicated that the recovered alumina contained no trace of sodium components, iron oxide, titanium dioxide etc. and contained silica in an amount equal to 2.5% or less, with a yield of more than 70%. For example, a recovered alumina comprised a composition including, by weight, 98.3% $Al_2O_3$ and 1.7% $SiO_2$. Thus it will be appreciated that alumina was recovered from the original red mud with a yield of 70.3%.

As previously noted and as shown in FIG. 1 gaseous sulfur dioxide evolved at the last three stages can be advantageously returned back to the first two stages or the stages of recovering sodium components and iron oxide and titanium dioxide respectively.

Figure 2:
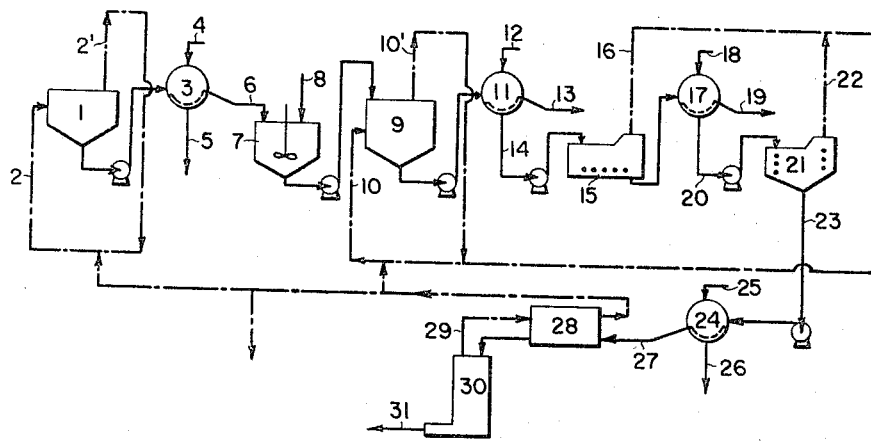
FIG. 2 shows diagramatically flow of materials and arrangement of apparatus for practicing the invention.

Referring now to FIG. 2, there is illustrated an apparatus suitable for use in carrying out the invention. At the first stage, an absorber tower 1 contains a slurry including the red mud of an appropriate concentration for example 30% by weight thereof and is supplied with relatively concentrated gaseous sulfur dioxide 2. The sulfur dioxide is blown in through the slurry to make the pH value of the same equal to the order of 4.3 whereupon the slurry is passed to a filter device 3. In the filter device 3 the slurry is rinsed with water 4 and filtered to be divided into a filtrate or an aqueous solution of sodium bisulfite with or without sodium sulfite in a small amount and a residue comprising alumina, iron oxide, titanium dioxide and silica, etc. The filtrate is discharged from the filter device 3 as diagramatically designated by solid line 5 while the residue 6 is fed into a mixer tank 7 constituting a part of the second stage. At the second stage, water 8 is added to the residue in the mixer tank 7 to form an aqueous suspension which, in turn, is passed to an absorber tower 9. In the absorber tower 9 concentrated gaseous sulfur dioxide 10 supplied from the succeeding stages of evolving the same is introduced into the aqueous suspension until its pH value reaches the order of 1.9. At that time, the aqueous suspension is fed into a filter device 11 where the same is filtered while a stream of rinsing water 12 is allowed to pour into the suspension. As shown by solid line 13 in FIG. 2 an insoluble matter including iron oxide, titanium dioxide and a small amount of silica is discharged from the filter device 11. At the same time, an aqueous solution of aluminum bisulfite 14 is supplied to the third stage.

As shown by dotted-and-dashed lines 2' and 10' those portions of gaseous sulfur dioxide not absorbed by the slurry and the aqueous suspension in the absorber towers 1 and 9 respectively are intended to be fed back to the associated towers for the purpose of re-circulation.

At the third stage, the aqueous solution of aluminum bisulfite 14 is fed into a device 15 for degassing sulfur dioxide and heated to drive off some of the gaseous sulfur dioxide 16 from the solution until its pH value becomes equal to the order of from 2.5 to 3.0. Thereby silica is deposited. A mixture of an alumina containing solution and the deposited silica is fed into a filter device 17 to be filtered while a stream of rinsing water 18 is allowed to pour into the mixture. A residue containing silica is discharged from the filter device 17 as diagramatically shown solid line 19 whereas a filtrate 20 rich in alumina is extracted and passed to the fourth stage.

At the fourth stage, the filtrate 20 is first heated in a degassing device 21 to drive off some of the gaseous sulfur dioxide 22 until the pH value of the filtrate is increased up to the order of 4.3 in order to deposit basic aluminum bisulfite. Then a slurry 23 of such bisulfite is introduced into a filter device 24 where the same is filtered with a rinsing water 25 allowed to pour into the slurry. The deposited basic aluminum bisulfite is taken out from the filter device 24 as shown by solid line 27 in FIG. 2 and a filtrate 26 containing some amounts of silica and alumina is thrown away.

At the last or fifth stage, the basic aluminum bisulfite 27 thus produced is dried in a drying device 28 by utilizing a hot gas 29 containing gaseous sulfur dioxide and supplied by a calciner oven 30. The dried aluminum bisulfite is fed into the oven 30 where the same is calcined at approximately 600° C. to be decomposed into substantially pure alumina 31 and concentrated gaseous sulfur dioxide. To this end a combustion gas of heavy oil (not shown) may be supplied to the calciner oven 30.

The portions of gaseous sulfur dioxide 16, 22, 29 evolved at the third, fourth and fifth stages respectively are suitably used as the gaseous sulfur dioxide 2 and 10 supplied to the first and second stages respectively as shown by dotted-and-dashed line in FIG. 2.

As previously pointed out, any waste gas containing gaseous sulfur dioxide may be advantageously used in practicing the invention. If such gaseous sulfur dioxide will have its low concentration then another absorber tower (not shown) may be advantageously provided prior to the absorber tower 1 (FIG. 2) and include a slurry containing the red mud whose concentration is at most 40% as previously described. The waste gas is fed into the other absorber tower where the same is scrubbed with the slurry and then discharged into the atmosphere as a harmless gas while the resulting solution is supplied to the absorber tower 1. Conveniently, a gas discharged by the absorber tower 1 may be similarly treated in the other absorber tower and then discharged into the atmosphere as a harmless gas.

The filtrate 26 from the filter device 24 may be advantageously supplied to the other absorber tower as above described and/or the absorber tower 1 for the purpose of using the same as making-up or supplementary feed water for the slurry.

The hot gas leaving the drying device 28 may be preferably passed to a cooling tower (not shown) before the same is fed to the first and second stages. The hot gas will flow through the cooling tower in countercurrent relationship with a flow of coolant through the same to be cooled. If the filtrate 5 from the filter device 3 will be used as such a coolant, the filtrate is concentrated by having the hot gas contacting the same. In addition, the partial decomposition of sodium bisulfite causes gaseous sulfur dioxide to be evolved resulting in increase in the concentration of gaseous sulfur dioxide leaving the cooling tower.

From the foregoing it will be appreciated that in simple manner with high yields the invention can recover separately the valuable components contained in the red mud by the provision of a process comprising the steps of absorbing gaseous sulfur dioxide by a slurry including the red mud of a suitable concentration to separate and recover sodium component; adding water to the resulting residue to form an aqueous suspension; reacting gaseous sulfur dioxide on the aqueous suspension to dissolve alumina and silica and also to separate and recover iron oxide, titanium dioxide; heating the resulting solution to drive off some of the gaseous sulfur dioxide which is supplied to the preceding steps, and to deposit silica for the purpose of recovering the same; further heating the remaining solution to drive off some of the gaseous sulfur dioxide which is also supplied to the preceding steps and to deposit and separate basic aluminum bisulfite which, in turn, is calcined into alumina. Also the invention has provided utilization of waste gases.

What we claim is:

1. A method of treating red mud to recover therefrom sodium as sodium bisulfite, iron as ferric oxide, titanium as titanium dioxide, silicon as silica and aluminum as alumina comprising adding water to said red mud to form a slurry having a red mud concentration no greater than 40% by weight, contacting the slurry with sulfur dioxide to absorb the sulfur dioxide into the slurry until the pH of the slurry is at a value of from 3.5 to 6 to dissolve sodium oxide contained in the red mud out of the red mud into the water to form a solution of sodium bisulfite, separating said solution from an insoluble residue of the red mud, adding water to the insoluble residue to form an aqueous suspension thereof, contacting the suspension with sulfur dioxide to absorb the sulfur dioxide into the suspension until the pH of the suspension is at a value of from 1.5 to 2.5 to dissolve alumina and silica contained in the red mud residue out of the residue into the water to form a solution of aluminum bisulfite and silica and to leave in an undissolved state ferric oxide and titanium dioxide initially contained in the red mud, separating the last mentioned solution from an insoluble residue of the first mentioned insoluble residue, heating the last mentioned solution to drive some of the sulfur dioxide therefrom to adjust the pH thereof to a value of from 2.5 to 3 whereby the silica precipitates therefrom, leaving a residual solution, heating the residual solution to drive some of the sulfur dioxide therefrom to adjust the pH thereof to a value above 3.5 whereby aluminum bisulfite precipitates therefrom, and calcining the aluminum bisulfite at a temperature of from 500 to 700° C. to decompose the aluminum bisulfite into alumina.

2. A method according to claim 1, in which the temperature of the slurry is from room temperature to 100° C.

3. A method according to claim 1, in which the sulfur dioxide driven from the second mentioned solution to precipitate silica therefrom is fed back to the red mud slurry for absorption by the slurry and to the aqueous suspension for absorption by the suspension.

4. A method according to claim 1, in which the sulfur dioxide driven from the residual solution to precipitate aluminum bisulfite therefrom is fed back to the red mud slurry for absorption by the slurry and to the aqueous suspension for absorption by the suspension, and sulfur dioxide evolved by the calcining of the aluminum bisulfite is first brought into contact with the precipitated aluminum bisulfite to dry the aluminum bisulfite and then fed back to the red mud slurry for absorption by the slurry and to the aqueous suspension for absorption by the suspension.

5. A method according to claim 1, in which the sulfur dioxide evolved by the calcining of the aluminum bisulfite is first brought into contact with the precipitated aluminum bisulfite to dry the aluminum bisulfite and then brought into countercurrent contact with the sodium bisulfite solution to evaporate water therefrom and thereby concentrate the solution.

6. A method according to claim 1, in which the water remaining after the precipitation of the aluminum bisulfite is fed back to the red mud for making the red mud slurry.

7. A method according to claim 1, in which the slurry is contacted with the sulfur dioxide in two stages.

References Cited by the Examiner

UNITED STATES PATENTS

| | | | |
|---|---|---|---|
| 1,959,448 | 5/1934 | Staufer et al. | 23—15 X |
| 3,025,131 | 3/1962 | Lerner | 23—15 X |
| 3,235,328 | 2/1966 | Lerner et al. | 23—15 |

OSCAR R. VERTIZ, *Primary Examiner.*

H. T. CARTER, *Assistant Examiner.*